United States Patent Office 3,122,416
Patented Feb. 25, 1964

3,122,416
PROCESS OF MAKING TETRAFLUOROHYDRAZINE AND FLUOROCARBONS
Jack R. Gould, Monsey, and Russell A. Smith, New York, N.Y., assignors to Stauffer Chemical Company, a corporation of Delaware
No Drawing. Filed May 23, 1960, Ser. No. 30,786
4 Claims. (Cl. 23—205)

This invention relates to a method of making tetrafluorohydrazine and fluorocarbons such as $CF_4$ and $C_2F_6$. More particularly, the invention relates to a method of making tetrafluorohydrazine and fluorocarbons from nitrogen trifluoride, utilizing carbon as the fluorine acceptor.

It has previously been proposed to make tetrafluorohydrazine by the reaction of nitrogen trifluoride with a metal such as copper. When $NF_3$ gas is passed over copper turnings at elevated temperatures, tetrafluorohydrazine can be produced; but the reaction is troublesome and unreliable since widely different results are obtained depending in large part upon the type of copper used, e.g., its purity, physical state, surface area, treatment prior to use in the process, etc. Results obtained with copper are unpredictable and vary between virtual nonreactivity (to give almost complete recovery of $NF_3$), and undesirably high reactivity (to give complete conversion of the $NF_3$ and copper to elemental nitrogen and copper fluoride). In either case the yields of tetrafluorohydrazine would be low or nil. Even with the most careful preconditioning of the copper surface, the results are variable and unpredictable.

Further difficulties inherent in the copper process lie in the production of solid by-products, and in the relatively long contact times required.

It is also possible to make $N_2F_4$ from $NF_3$ by heating the $NF_3$ in a stainless steel vessel. However, even after one hour at 500° C. only a very low yield is obtained.

We have discovered a superior production process utilizing a bed of carbon as the acceptor of the fluorine from the nitrogen trifluoride. Thus, not only is $N_2F_4$ produced but also fluorocarbons so that the use of carbon as an acceptor is highly advantageous. Preferably, the process is conducted with a fluidized bed of carbon, although a static bed may be employed. The products of the reaction are entirely gaseous, so that the bed does not become poisoned during the course of the reaction. If a fluidized process is used, the contact of the $NF_3$ with the carbon is on the order of three seconds, and the reaction is thus much faster than the prior known process utilizing copper turnings which requires contact times on the order of 10 to 15 minutes.

We have used various grades of carbon and it has been found that substantially any carbon may be used. The carbon produced from the coking of petroleum is inexpensive, readily available and entirely suitable. Carbon which has been activated with air and steam may be used, although such activation is not ordinarily necessary. The particle size of the carbon is not critical, although if a fluidized process is utilized, it is obvious that the particle size will be selected which will give ready fluidization with relatively little elutriation. In such instances, a particle size from —80 to +200 will be found suitable.

Preferably the reactor is of a material which is inert under the reaction conditions, such as stainless steel.

The reaction temperatures can vary from about 250° C. to 600° C., preferably from 400° C. to 500° C.

As a feed gas, $NF_3$ by itself can be used, or it can be mixed with an inert gas such as helium or nitrogen although there is no particular advantage in using the inert gas. Further, the $NF_3$ need not be pure, but can be a technical grade which contains contaminants, e.g. 5–10% $CF_4$ or low concentrations of nitrogen oxides or subfluorides.

The following non-limiting examples illustrate preferred methods of practicing the present invention. Examples 1 through 8 give data on the products of $N_2F_4$ while Examples 9 and 10 illustrate the production of fluorocarbons as well.

EXAMPLES 1–7

The reactor was constructed of 1″ mild steel pipe threaded to accommodate hose connections at each end. The reactor was heated over a 1 foot section in a vertically supported split-level furnace. Temperatures were read from a Chromel-Alumel thermocouple lying along the outside surface of the reactor at bed height. The reactor was loaded with an appropriate fluidizable carbon (—80 +200 mesh), 3″ static height, resting on a grog of —8 +20 mesh graphite lumps and placed in the furnace in a position so that the bed would fall about midway in the furnace. The bed was fluidized with helium while the temperature was being raised. A glass gas collecting train was attached to the exit end of the reactor. The train consisted of a —196° C. trap, preceded by a —78° C. trap, and followed by a mercury bubbler. All connections were made with heavy wall inert plastic (Tygon) tubing. After stable operating temperature was reached, the reacting gases were admitted to the bottom of the reactor at a fluidizing flow of about 0.1 ft./sec. superficial velocity. Flow rates were measured with flow meters. When the reaction was finished, the apparatus was swept out with helium and the contents of the —196° C. trap taken to the vacuum line for examination. The following data were obtained:

*Table*

THE PREPARATION OF $N_2F_4$ BY THE REACTION OF $NF_3$ WITH A FLUID BED OF CARBON

| Example Number | Type Coke | Feed Gas | Feed Rate, cc./Min. | Temp., °C. | Mols $NF_3$ Fed | Recovery (moles) | | Percent Conv. $NF_3$ | Percent Yield $N_2F_4$ | Percent Yield $N_2F_4$ (Corrected) |
|---|---|---|---|---|---|---|---|---|---|---|
| | | | | | | $NF_3$ | $N_2F_4$ | | | |
| 1 | A | $2NF_3$:1 He | 270 | 450 | 0.18 | 0.135 | 0.021 | 25 | 23 | 93 |
| 2 | A | $2NF_3$:1 He | 270 | 470 | 0.185 | 0.11 | 0.031 | 40.5 | 33.5 | 84 |
| 3 | A | $NF_3$ | 250 | 470 | 0.19 | 0.052 | 0.030 | 73 | 31.5 | 42 |
| 4 | A | $NF_3$ | 302 | 440 | 0.12 | 0.029 | 0.033 | 76 | 55 | 73 |
| 5 | B | $NF_3$ | 302 | 400 | 0.12 | 0.036 | 0.011 | 70 | 18 | 26 |
| 6 | B | $NF_3$ | 320 | 360 | 0.13 | 0.102 | 0.009 | 21.5 | 14 | 69 |
| 7 | A | $NF_3$ | 280 | 490 | 0.225 | 0.049 | 0.068 | 78 | 60 | 77 |

Coke A: National Carbon Co. petroleum coke W-8300, —80 +200 mesh aerated for removal of fines.
Coke B: Petroleum coke, activated in two stages with air and steam, —80 +200 mesh, aerated for removal of fines.

EXAMPLE 8

In order to demonstrate the use of a static bed in carrying out the reaction, the reactor and auxiliary equipment described was used except that the coke was petroleum coke sized −8 +20 mesh. The feed gas was $NF_3$ fed at a rate of 320 cc. per minute and the temperature was maintained at 400° C. A quantity of 0.12 moles of $NF_3$ was fed and there was recovered 0.09 moles $NF_3$ and 0.01 moles $N_2F_4$. This represents an $NF_3$ conversion of 25%, a yield of 17% $N_2F_4$ and a corrected yield of 67% $N_2F_4$.

EXAMPLE 9

Nitrogen trifluoride was passed at the rate of 0.1 linear ft./sec. through a 1-inch tubular steel reactor containing a 3-inch bed of 65–150 mesh fluidizable carbon. The outside wall temperature of the reactor was 440° C. The exit gases were trapped in a collection train consisting of a −78° trap followed by a −196° trap. The contents of the −196° trap were analyzed by fractional condensation, and by infrared analysis. Tetrafluorohydrazine and fluorocarbons were produced according to the following:

| Introduced | Obtained |
| --- | --- |
| 0.121 mole $NF_3$ (contained 0.014 mole $CF_4$ as contaminant) | 0.029 mole $NF_3$. 0.022 mole $CF_4$. 0.033 mole $N_2F_4$. 0.006 mole $C_2F_6$. |

Consequently, 76% of the original $NF_3$ was converted and of this, 72% appeared as $N_2F_4$. Carbon tetrafluoride, 0.008 mole, and 0.006 mole of $C_2F_6$ were created by reaction with the carbon. This represents 26.5% yield of $CF_4$ and 29.7% yield of $C_2F_6$ in accordance with the equations:

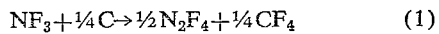
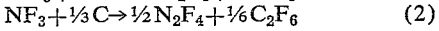

$$NF_3 + \tfrac{1}{4}C \rightarrow \tfrac{1}{2}N_2F_4 + \tfrac{1}{4}CF_4 \quad (1)$$
$$NF_3 + \tfrac{1}{3}C \rightarrow \tfrac{1}{2}N_2F_4 + \tfrac{1}{6}C_2F_6 \quad (2)$$

EXAMPLE 10

Nitrogen trifluoride was introduced as in Example 1 to the reactor which was maintained at a temperature of 490°. The gases were again trapped and analyzed as stated. A breakdown of the reaction products is shown below:

| Introduced | Recovered |
| --- | --- |
| 0.225 mole $NF_3$ (containing 0.025 mole $CF_4$ as contaminant) | 0.049 mole $NF_3$. 0.040 mole $CF_4$. 0.068 mole $N_2F_4$. 0.014 mole $C_2F_6$. |

Consequently, 78% of the $NF_3$ was converted and of this, 77% appeared as $N_2F_4$. Carbon tetrafluoride, 0.015 mole, and 0.014 mole of $C_2F_6$ were created by reaction with the carbon. This represents 34.1% yield of $CF_4$ and 48.3% yield of $C_2F_6$ in accordance with Equations 1 and 2.

This application is a continuation-in-part of application Serial No. 803,801, filed on April 2, 1959.

We claim:

1. A process of making $N_2F_4$ and fluorocarbons consisting of heating a gas selected from the class consisting of $NF_3$ and an $NF_3$-inert gas mixture to at least about 250° C. and not in excess of about 600° C. while in contact with a bed of carbon.

2. A process of making $N_2F_4$ and fluorocarbons consisting of heating a gas selected from the class consisting of $NF_3$ and an $NF_3$-inert gas mixture to at least about 250° C. and not in excess of about 600° C. while in contact with a bed of fluidized particulate carbon, said carbon being obtained from the coking of petroleum.

3. A process of making $N_2F_4$ and fluorocarbons consisting of heating a gas selected from the class consisting of $NF_3$ and an $NF_3$-inert gas mixture to at least about 250° C. and not in excess of about 600° C. while in contact with a bed of fluidized carbon particles, said carbon falling within the particle size range −80 to +200 mesh, said carbon being obtained from the coking of petroleum.

4. A process of making $N_2F_4$ and fluorocarbons consisting of heating a gas selected from the class consisting of $NF_3$ and an $NF_3$-inert gas mixture to at least about 400° C. and not in excess of about 500° C. while in contact with a bed of fluidized carbon particles, said carbon falling within the particle size range −80 to +200 mesh, said carbon being obtained from the coking of petroleum.

References Cited in the file of this patent

UNITED STATES PATENTS

| 2,709,186 | Farlow et al. | May 24, 1955 |
| 2,852,574 | Denison et al. | Sept. 16, 1958 |

OTHER REFERENCES

Colburn et al.: "Journal of The American Chemical Society," vol. 80, page 5004 (September 1958). (Copy in Scientific Library.)

"Fluorine Chemistry," by Simons, vol. 1, 1950 ed., pp. 88, 87, Academic Press, Inc., N.Y. (Copy in Scientific Lib.)